US012812234B2

(12) United States Patent
Takahashi

(10) Patent No.: US 12,812,234 B2
(45) Date of Patent: Nov. 24, 2026

(54) INFORMATION PROCESSING APPARATUS, CONTROL METHOD, STORAGE MEDIUM, AND IMAGING SYSTEM

(71) Applicant: CANON KABUSHIKI KAISHA, Tokyo (JP)

(72) Inventor: Ryotaro Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 18/999,238

(22) Filed: Dec. 23, 2024

(65) Prior Publication Data

US 2025/0227355 A1 Jul. 10, 2025

(30) Foreign Application Priority Data

Jan. 4, 2024 (JP) ................................. 2024-000307

(51) Int. Cl.

| | |
|---|---|
| ***G01S 17/89*** | (2020.01) |
| ***H04N 23/611*** | (2023.01) |
| ***H04N 23/667*** | (2023.01) |
| ***H04N 23/67*** | (2023.01) |

(52) U.S. Cl.

CPC ............ *H04N 23/611* (2023.01); *G01S 17/89* (2013.01); *H04N 23/667* (2023.01); *H04N 23/671* (2023.01)

(58) Field of Classification Search

CPC .... H04N 5/2226; H04N 23/611; H04N 23/65; H04N 23/651; H04N 23/667; H04N 23/671; H04N 23/70–74; G06T 7/521; G01S 17/894

USPC ..................................................... 348/207.99

See application file for complete search history.

(56) References Cited

U.S. PATENT DOCUMENTS

| | | | | |
|---|---|---|---|---|
| 9,704,250 | B1 * | 7/2017 | Shah | H04N 23/676 |
| 11,380,120 | B2 | 7/2022 | Wakayama | |
| 11,659,155 | B2 * | 5/2023 | Park | H04N 13/254 348/46 |
| 2019/0178974 | A1 * | 6/2019 | Droz | G01S 7/4815 |
| 2020/0132819 | A1 * | 4/2020 | Dielacher | G01S 17/36 |
| 2020/0311400 | A1 | 10/2020 | Wakayama | |
| 2025/0306189 | A1 * | 10/2025 | Choi | G01S 7/4865 |

FOREIGN PATENT DOCUMENTS

| | | | | |
|---|---|---|---|---|
| CN | 112823511 A * | 5/2021 | | H04N 23/55 |
| JP | 2020-166485 A | 10/2020 | | |
| WO | WO-2021166912 A1 * | 8/2021 | | G06V 10/757 |

* cited by examiner

*Primary Examiner* — Anthony J Daniels

(74) *Attorney, Agent, or Firm* — Venable LLP

(57) ABSTRACT

An apparatus obtains three-dimensional shape information of a scene shot by an image capturing apparatus; obtains state information relating to an image capturing state of the image capturing apparatus; outputs the three-dimensional shape information to the image capturing apparatus; and controls an operation of the outputting. At least first three-dimensional shape information or second three-dimensional shape information with a higher spatial resolution than the first three-dimensional shape information is obtained for the scene, and whether the first three-dimensional shape information or the second three-dimensional shape information is output is controlled according to the state information.

14 Claims, 7 Drawing Sheets

INFORMATION PROCESSING APPARATUS, CONTROL METHOD, STORAGE MEDIUM, AND IMAGING SYSTEM

BACKGROUND OF THE INVENTION

Field of the Invention

The present invention relates to an information processing apparatus, a control method, a storage medium, and an imaging system and in particular relates to imaging technology using three-dimensional shape information.

Description of the Related Art

A known apparatus generates information of the three-dimensional shape of an object (three-dimensional shape information). For example, with a distance measuring apparatus such as a light detection and ranging (LiDAR) sensor, the distance from the apparatus to the object is measured, and the measurement result is converted to generate three-dimensional shape information of the object.

The three-dimensional shape information is used not only as a three-dimensional model of the object but can also be used in various technologies. For example, in the field of image capturing apparatuses and the like, when image capture control such as focus control and exposure control is performed, the three-dimensional shape information can also be used in subject detection.

With three-dimensional shape information, higher spatial resolution means that the shape of the object can be more accurately represented. In other words, the higher the accuracy of the three-dimensional shape information, the more suitable the performed image capture control is for the object. On the other hand, with high spatial resolution, the information amount of the three-dimensional shape information increases. Thus, in the image capturing apparatus, the computation load for processing the three-dimensional shape information increases. Regarding this, Japanese Patent Laid-Open No. 2020-166485 describes technology for distance measuring limited to a region estimated to be a human body.

However, from the perspective of appropriately recognizing the scene being shot for image capture control, the three-dimensional shape information obtained via distance measuring that is restricted to one region as in Japanese Patent Laid-Open No. 2020-166485 may not be suitable.

SUMMARY OF THE INVENTION

The present invention has been made in consideration of the aforementioned problems and realizes an information processing apparatus, a control method, a storage medium, and an imaging system for outputting three-dimensional shape information suited to the state of an image capturing apparatus.

The present invention in its first aspect provides an information processing apparatus comprising: at least one processor and/or circuit; and at least one memory storing computer program, which causes the at least one processor and/or circuit to function as following units: a first obtaining unit configured to obtain three-dimensional shape information of a scene shot by an image capturing apparatus, a second obtaining unit configured to obtain state information relating to an image capturing state of the image capturing apparatus, an output unit configured to output the three-dimensional shape information to the image capturing apparatus, and a control unit configured to control an operation of the output unit, wherein the first obtaining unit obtains at least first three-dimensional shape information or second three-dimensional shape information with a higher spatial resolution than the first three-dimensional shape information for the scene, and the control unit controls whether the first three-dimensional shape information or the second three-dimensional shape information is output according to the state information.

The present invention in its second aspect provides a control method for an information processing apparatus comprising: obtaining three-dimensional shape information of a scene shot by an image capturing apparatus; obtaining state information relating to an image capturing state of the image capturing apparatus; outputting the three-dimensional shape information to the image capturing apparatus; and controlling an operation of the outputting, wherein at least first three-dimensional shape information or second three-dimensional shape information with a higher spatial resolution than the first three-dimensional shape information is obtained for the scene, and whether the first three-dimensional shape information or the second three-dimensional shape information is output is controlled according to the state information.

The present invention in its third aspect provides a computer-readable storage medium storing a program configured to cause a computer to function as the units of the information processing apparatus of the first aspect.

The present invention in its fourth aspect provides an imaging system comprising: an image capturing apparatus; distance measuring apparatus that performs distance measuring of a scene shot by the image capturing apparatus and generates three-dimensional shape information; and an information processing apparatus that controls output of the three-dimensional shape information to the image capturing apparatus, wherein the information processing apparatus comprises at least one processor and/or circuit; and at least one memory storing computer program, which causes the at least one processor and/or circuit to function as following units: a first obtaining unit configured to obtain the three-dimensional shape information from the distance measuring apparatus, a second obtaining unit configured to obtain state information relating to an image capturing state of the image capturing apparatus from the image capturing apparatus, an output unit configured to output the three-dimensional shape information to the image capturing apparatus, and a control unit configured to control an operation of the output unit, wherein the first obtaining unit obtains at least first three-dimensional shape information or second three-dimensional shape information with a higher spatial resolution than the first three-dimensional shape information for the scene, and the control unit controls whether the first three-dimensional shape information or the second three-dimensional shape information is output according to the state information.

Further features of the present invention will become apparent from the following description of exemplary embodiments (with reference to the attached drawings).

DESCRIPTION OF THE EMBODIMENTS

First Embodiment

Figure 1:
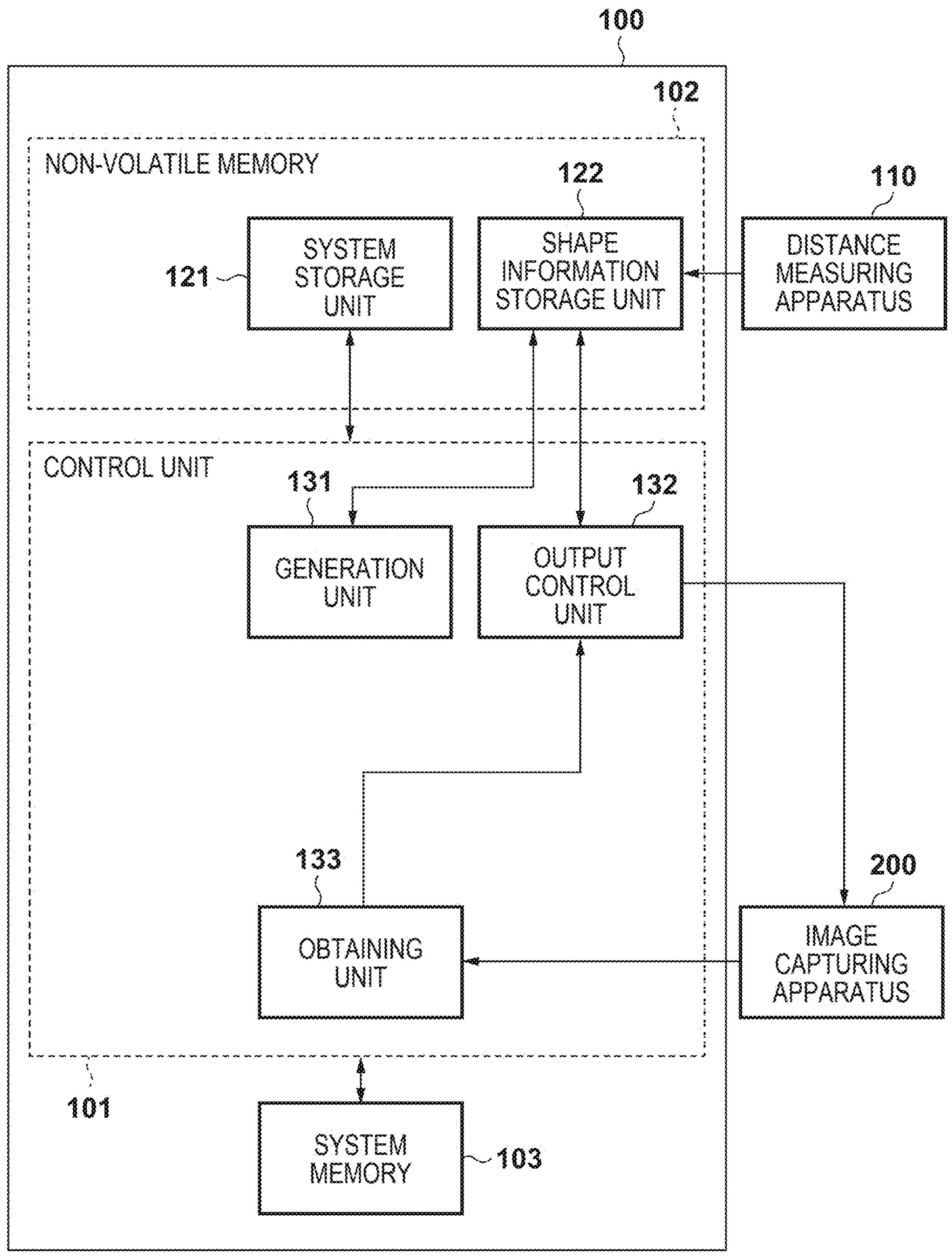
FIG. 1 is a block diagram illustrating the functional configuration of an imaging system according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In an embodiment described below, the present invention is applied to a system, an example of an imaging system, that includes an image capturing apparatus 200, a distance measuring apparatus 110, and a PC 100 that can output three-dimensional shape information of a scene captured by the image capturing apparatus 200. However, the present invention can be applied to any device in which the image capturing apparatus 200 and the distance measuring apparatus 110 are connected, three-dimensional shape information based on the distance measuring result of the scene is obtained, and three-dimensional shape information can be output to an image capturing apparatus. Examples of such devices include a PC as well as various types of devices with an information processing function such as tablet computers, media players, PDAs, smartphones, game consoles, robots, drones, drive recorders, and the like.

Functional Configuration of Imaging System

FIG. 1 is a block diagram illustrating each apparatus included in an imaging system according to the present embodiment and the functional configuration of the PC 100 therein.

The distance measuring apparatus 110 measures the distance to the scene captured by the image capturing apparatus 200 and generates three-dimensional shape information of the scene. The distance measuring apparatus 110 can use a LiDAR sensor, for example. The LiDAR sensor includes a light beam output unit that outputs a light beam and emits a light beam at a surface of an object and a receiving unit that receives the reflected light beam from the surface of the object. Also, the LiDAR sensor uses the time taken for the reflected light beam to return or the phase difference between the emitted light beam and the reflected light beam to drive (measure) the distance to the object surface in the emission direction. By combining the distance relating to the emission direction obtained in this manner and the information of the emission direction, the three-dimensional coordinates for a point on the object surface in the emission direction can be identified. The LiDAR sensor can generate a three-dimensional point group for an object distributed in the scene by performing such distance measuring while changing the emission direction. Here, a three-dimensional point group generated by the LiDAR sensor can indicate the three-dimensional shape of the object surface at the scene. Thus, hereinafter, the data generated as distance measuring data by the LiDAR sensor may be referred to as "three-dimensional shape information". Then, the distance measuring apparatus 110 outputs the three-dimensional shape information as the scene distance measuring result.

Note that in the present embodiment described herein, the distance measuring apparatus 110 is included in PC 100, but the embodiments of the present invention are not limited thereto. The distance measuring apparatus 110 may also naturally be an external apparatus that can be detached from the PC 100.

The three-dimensional shape information output by the distance measuring apparatus 110 is stored in a shape information storage unit 122 of a non-volatile memory 102. The non-volatile memory 102 is an electrically erasable and recordable storage apparatus such as an EEPROM or the like. The non-volatile memory 102 can be configured to permanently store information. In the present embodiment, this storage area is divided between a system storage unit 121 and the shape information storage unit 122.

The control unit 101 is a control apparatus including at least one processor that controls the operation of each block included in the PC 100. Specifically, for example, the control unit 101 controls the operation of each block by loading an operation program of each block stored in the system storage unit 121 of the non-volatile memory 102 described below onto system memory 103 and executing the operation programs. In the PC 100 according to the present embodiment, the control unit 101 operates as a generation unit 131, an output control unit 132, and an obtaining unit 133 by executing an operation program.

On the basis of the three-dimensional shape information output by the distance measuring apparatus 110, the generation unit 131 generates three-dimensional shape information with a higher spatial resolution than the three-dimensional shape information. Hereinafter, when making a distinction between the three-dimensional shape information output by the distance measuring apparatus 110 and the three-dimensional shape information generated by the generation unit 131, the former is referred to as the "low resolution shape information" and the latter is referred to as the "high resolution shape information". To generate the high resolution shape information from the low resolution shape information, an inference model obtained via deep learning using CNN may be used, for example. The high resolution shape information generated by the generation unit 131 is stored in the shape information storage unit 122 of the non-volatile memory 102.

The output control unit 132 controls the output of the three-dimensional shape information to the image capturing apparatus 200. As described above, in the PC 100 according to the present embodiment, since two types of three-dimensional shape information, low resolution shape information and high resolution shape information, can be output to the image capturing apparatus 200, the output control unit 132 controls which three-dimensional shape information to output.

The obtaining unit 133 obtains information (hereinafter referred to as state information) indicating the image capturing state of the image capturing apparatus 200. In the present embodiment, the PC 100 intermittently monitors the connected image capturing apparatus 200 and successively obtains state information. The state information may be obtained via intermittent delivery from the image capturing apparatus 200 or by being sent back from the image capturing apparatus 200 in response to an obtaining request from the obtaining unit 133.

The functional configuration may be implemented by a single processor constituting the control unit 101 or may be implemented by a plurality of processors cooperating or sharing the workload.

The system memory 103 is a rewritable volatile storage apparatus such as DRAM or the like. The system memory 103 is used as a loading area for the operation program of each block as well as a storage area for information such as intermediate data output in the operation of each block.

The image capturing apparatus 200 is a digital still camera, for example. The image capturing apparatus 200 includes a lens unit (imaging optical system), an image sensor that converts an optical image of a captured scene into an analog image signal, and an A/D converter that converts an analog image signal into a digital signal. An optical image is input into the image sensor via the lens unit, and the electrical signal obtained by conversion at the image sensor is converted into a digital signal to obtain image data. The image data obtained via image capture by the image capturing apparatus 200 is stored in a non-illustrated storage medium detachably connected to the image capturing apparatus 200, for example.

As described above, in the imaging system according to the present embodiment, the image capturing apparatus 200 obtains the three-dimensional shape information output by the PC 100. Here, the three-dimensional shape information output by the PC 100 is at least the low resolution shape information or the high resolution shape information. The image capturing apparatus 200 is configured to execute a predetermined operation using the information in the case of obtaining either three-dimensional shape information. At this time, since the information amount is less in the case of the low resolution shape information compared to the high resolution shape information, the predetermined operation can be executed with a lower computation load when using the former compared to the latter. On the other hand, since the spatial resolution of the latter is higher and the shape of the object distributed in the scene captured by the image capturing apparatus 200 is represented in finer detail, the reliability and accuracy of the predetermined operation of the latter compared to the former is higher.

The predetermined operation using the three-dimensional shape information executed by the image capturing apparatus 200 can include an operation to change the focus state of the optical system, for example. In this case, since the distribution of the object in the scene can be obtained from the three-dimensional shape information, the distance from the image capturing apparatus 200 to each object can be obtained. Thus, for example, in response to an operation of designating (designating in a captured image) a subject to focus on being received at the image capturing apparatus 200, on the basis of the three-dimensional shape information, the subject distance of the subject is determined as the focus position of the imaging optical system. Alternatively, for example, on the basis of the three-dimensional shape information, the subject distance of the object distributed in a predetermined region in the captured field of view of the image capturing apparatus 200 is identified, and the subject distance is determined as the focus position of the imaging optical system. Thereafter, the image capturing apparatus 200 performs control to change the state of the imaging optical system to focus on the focus position determined.

The predetermined operation using the three-dimensional shape information executed by the image capturing apparatus 200 can include an exposure control operation based on the subject, for example. In this case, for example, an object indicating a predetermined shape is detected as the subject using the three-dimensional shape information and exposure control is performed to represent the subject as image data via appropriate exposure.

In the present embodiment, two examples have been given as the predetermined operations using the three-dimensional shape information executed by the image capturing apparatus 200. However, it should be easily understood that the embodiments of the present invention are not limited to these examples. In other words, in the image capturing apparatus 200, the three-dimensional shape information may be used in a different way.

Overview of Output Control

Output control of the three-dimensional shape information performed by the output control unit 132 will be described below in detail.

In the PC 100 according to the present embodiment, basically, the output control unit 132 outputs the high resolution shape information generated by the generation unit 131 on the basis of the low resolution shape information obtained from the distance measuring apparatus 110 to the image capturing apparatus 200. On the other hand, since the high resolution shape information has a larger information amount than the low resolution shape information, when it is used in the predetermined operation in the image capturing apparatus 200, the computation load is higher. Such an increase in the computation load may affect image capturing by the image capturing apparatus 200 and as a result may cause suitable image capture operations to not be performed including image data of the desired image quality not being recorded, image capture at the desired timing not being performed, and the like.

In the present embodiment, a state of the image capturing apparatus 200 that should avoid an increase in load caused by using such high resolution shape information includes a state in which the image capturing apparatus 200 is performing continuous shooting. Accordingly, in a case where the image capturing apparatus 200 is performing continuous shooting, the PC 100 according to the present embodiment is configured to not output high resolution shape information to the image capturing apparatus 200. In other words, the output control unit 132 performs control to output low resolution shape information as the three-dimensional shape information if the image capturing apparatus 200 is performing continuous shooting and output high resolution shape information if the image capturing apparatus 200 is not performing continuous shooting.

To implement such output control, in the imaging system according to the present embodiment, the obtaining unit 133 intermittently obtains state information from the image capturing apparatus 200. In the present embodiment, the state information include information that can identify at least whether or not the image capturing apparatus 200 is performing continuous shooting. The output control unit 132 determines whether or not the image capturing apparatus 200 is performing continuous shooting on the basis of the state information obtained by the obtaining unit 133. The output control unit 132 controls whether to output the low resolution shape information or the high resolution shape information as the three-dimensional shape information on the basis of whether or not the image capturing apparatus 200 is performing continuous shooting.

Here, the low resolution shape information output by the distance measuring apparatus 110 may change from moment to moment. If high resolution shape information is not to be output to the image capturing apparatus 200, there is no need to execute processing to generate high resolution shape information from the low resolution shape information in the PC 100. Accordingly, in a case where the output control unit 132 determines that the image capturing apparatus 200 is performing continuous shooting, the output control unit 132 performs control so that the generation unit 131 does not execute processing to generate high resolution shape information. In other words, in an aspect where the low resolution shape information obtained from the distance measuring apparatus 110 is output unchanged, the output control unit 132 performs control so that the generation unit 131 does not execute processing to generate high resolution shape information. In other words, in the imaging system according to the present embodiment, in a case where the image capturing apparatus 200 is performing continuous shooting, control is performed in the PC 100 so that high resolution shape information is not generated and the low resolution shape information obtained from the distance measuring apparatus 110 is output.

Output Control Processing

Figure 2:
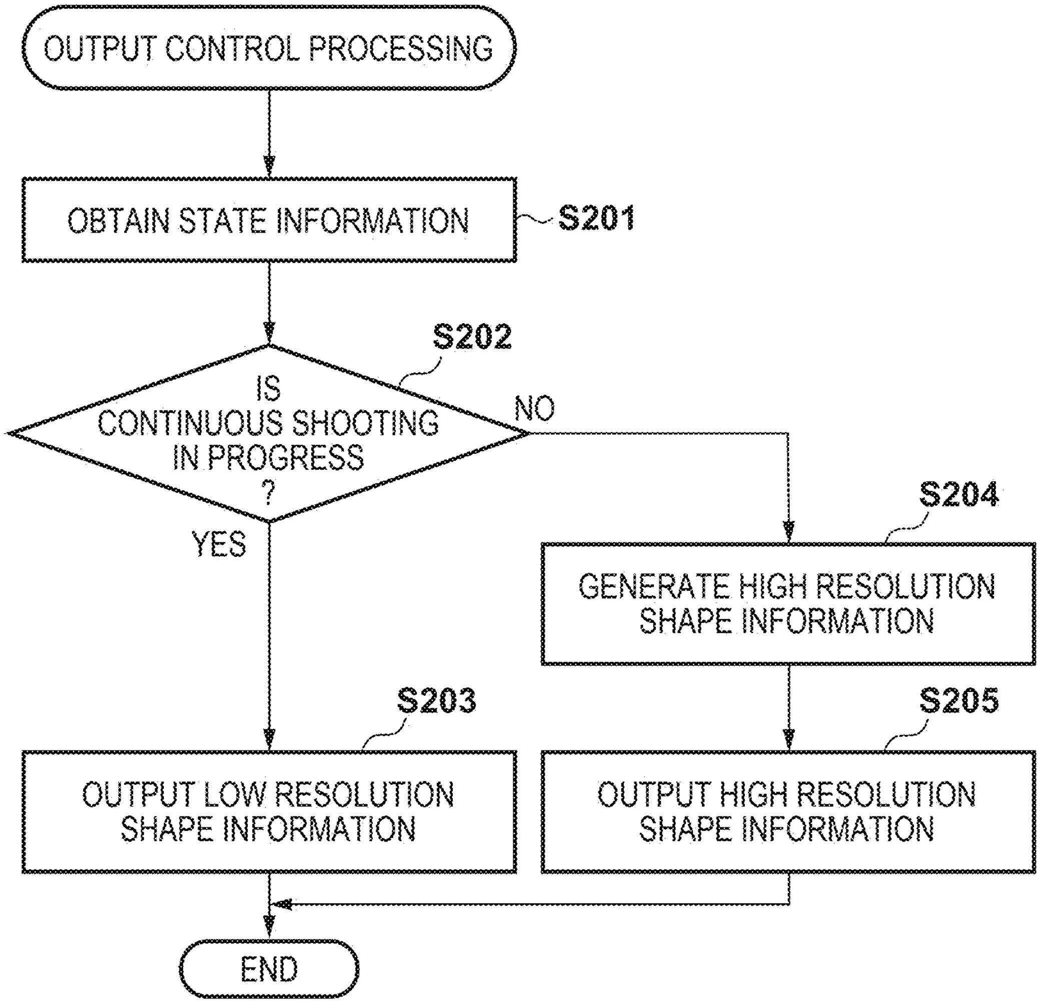
FIG. 2 is a flowchart illustrating the output control processing executed by a PC 100 according to the first embodiment of the present invention.

The output control processing executed by the PC 100 according to the present embodiment will be described below in detail using the flowchart of FIG. 2. The processing corresponding to the flowchart can be implemented by the control unit 101 reading out the corresponding processing programs stored in the non-volatile memory 102, for example, loading them onto the system memory 103, and executing them. The present output control processing described herein, for example, is started when the image capturing apparatus 200 and the PC 100 are connected and a shooting mode for performing a predetermined operation using three-dimensional shape information being set in the image capturing apparatus 200 is detected and is repeated at a predetermined frequency. Note that in a case where the operations of the processes described hereinafter are implemented by the functional components (the generation unit 131, the output control unit 132, and the obtaining unit 133) of the control unit 101, they are described with the functional component as the subject.

In step S201, the obtaining unit 133 obtains state information from the image capturing apparatus 200.

In step S202, the output control unit 132 determines whether or not the image capturing apparatus 200 is performing continuous shooting on the basis of the state information obtained in step S201. In a case where the output control unit 132 determines that the image capturing apparatus 200 is performing continuous shooting, the output control unit 132 advances the processing to step S203. In a case where the output control unit 132 determines that continuous shooting is not being performed, the output control unit 132 advances the processing to step S204.

In step S203, the output control unit 132 outputs the low resolution shape information stored in the shape information storage unit 122 to the image capturing apparatus 200 as three-dimensional shape information, and the present output control processing ends.

On the other hand, in a case where it is determined that continuous shooting is being performed in step S202, in step S204, the output control unit 132 causes the generation unit 131 to generate high resolution shape information. Specifically, the generation unit 131 generates high resolution shape information on the basis of the low resolution shape information stored in the shape information storage unit 122 and stores the high resolution shape information in the shape information storage unit 122.

In step S205, the output control unit 132 outputs the high resolution shape information generated in step S204 to the image capturing apparatus 200 as three-dimensional shape information, and the output control unit 132 completes the present output control processing.

As described above, according to the information processing apparatus of the present embodiment, three-dimensional shape information suited to the state of the information processing apparatus can be output. Specifically, the information processing apparatus according to the present embodiment, in a case where the image capturing apparatus is performing continuous shooting, can reduce the computation load in the image capturing apparatus by outputting low resolution shape information to the image capturing apparatus and can guarantee that image data suitable for continuous shooting is recorded. On the other hand, in a case where the image capturing apparatus is not performing continuous shooting, by outputting high resolution shape information to the image capturing apparatus, the information processing apparatus can realize an increase in accuracy in the focus control, subject detection, and the like in the image capturing apparatus.

Note that in the present embodiment described above, information indicating whether or not the image capturing apparatus 200 is performing continuous shooting is explicitly included in the state information. However, the embodiments of the present invention are not limited thereto. Whether or not the image capturing apparatus 200 is performing continuous shooting may be identified by analyzing information such as information of the output frequency of image data from the image capturing apparatus 200, additional information such as image capture time included in each image data, and the like obtained as state information.

First Modified Example

In the embodiment described above, by including information indicating whether or not the image capturing apparatus 200 is performing continuous shooting in the state information, low resolution shape information is output in the time period in which continuous shooting is actually being performed. However, control to not output high resolution shape information and output low resolution shape information does not need to be performed using the condition of continuous shooting being performed at the point in time when the state information is obtained. In other words, it is sufficient that such control is performed when an image capture operation of high frequency is performed by the image capturing apparatus 200, and various modifications can be made to the method for identifying whether or not there is an image capture operation.

For example, control may be performed in a case where the state information indicates that the image capturing apparatus 200 is in a state in which continuous shooting may be performed, such as a setting for performing continuous shooting being set in the image capturing apparatus 200, the image capturing apparatus 200 being activated in a shooting mode for continuous shooting, and the like.

Also, in the case of continuous shooting but so-called time lapse image capture is performed, the image capture frequency is low. Thus, even if high resolution shape information is used, there may not be an increase in the computation load that would affect the image capture processing. Thus, information of the image capture frequency such as information of the intervals of when performing continuous shooting, information of the shooting frame rate when performing moving image capture, and the like is included in the state information, and the output control unit 132 may perform output control on the basis of the information of the image capture frequency. In an aspect, the output control unit 132 performs control so that the low resolution shape information is output if the image capture frequency is greater than a predetermined threshold and the high resolution shape information is output if the image capture frequency is less than the predetermined threshold.

Second Embodiment

In the embodiment and modified example described above, from the perspective of avoiding computation resource pressure in the image capturing apparatus 200, control is performed so that the low resolution shape information is output if a high frequency image capture processing is executed. However, three-dimensional shape information output control may be performed from the perspective of avoiding processing delays and not avoiding computation resource pressure.

For example, in a case where a specific type of subject expected to have fast movement is being shot by the image capturing apparatus 200, a short exposure time is set so that at the timing when the shooter issues an image capture instruction, the subject is captured in a suitable state. In other words, in such a state, if the high resolution shape information is output from the PC 100, computation to process the high resolution shape information is performed in the image capturing apparatus 200. This may cause the image capture operation to not start immediately at the time when the image capture instruction is issued. Also, the time from one image capture operation until the next image capture operation can be performed is extended due to the processing of the high resolution shape information. Thus, there is a possibility of missing the chance to shoot the subject at the timing at which the subject is in the desired state.

In the imaging system according to the present embodiment, the state of the image capturing apparatus 200 that should avoid causing a processing delay caused by using the high resolution shape information is set as a state in which a specific type of subject is found in the shooting field of view of the image capturing apparatus 200. Accordingly, in a case where the specific type of subject is found in the shooting field of view of the image capturing apparatus 200, the PC 100 according to the present embodiment is configured to not output high resolution shape information to the image capturing apparatus 200. In other words, the output control unit 132 performs control to output low resolution shape information as the three-dimensional shape information if the specific type of subject is found in the shooting field of view of the image capturing apparatus 200 and output high resolution shape information if not.

Hereinafter, "person" will be used as the subject type for which high resolution shape information is not output, but it should be easily understood that the embodiments of the present invention are not limited thereto. In other words, the subject type for which an image capture operation with a short exposure time should be performed according to the image capture instruction as described above can be set on the basis of the movement tendencies and the like for each subject, and other non-person subjects may be used such as animals and moving bodies. In an aspect, such movement tendencies can be determined on the basis of information set per subject type, for example, including the shutter speed recommended at the time of image capture. At this time, the subject type set with a recommended shutter speed shorter than a predetermined amount of time can be identified as the type for which an image capture operation with a short exposure time should be used. Note that setting "person" as the subject type for which high resolution shape information is not output is simply an example. In another aspect, a configuration in which control is performed to output high resolution shape information in a case where a person is found in the shooting field of view is not excluded.

Figure 3:
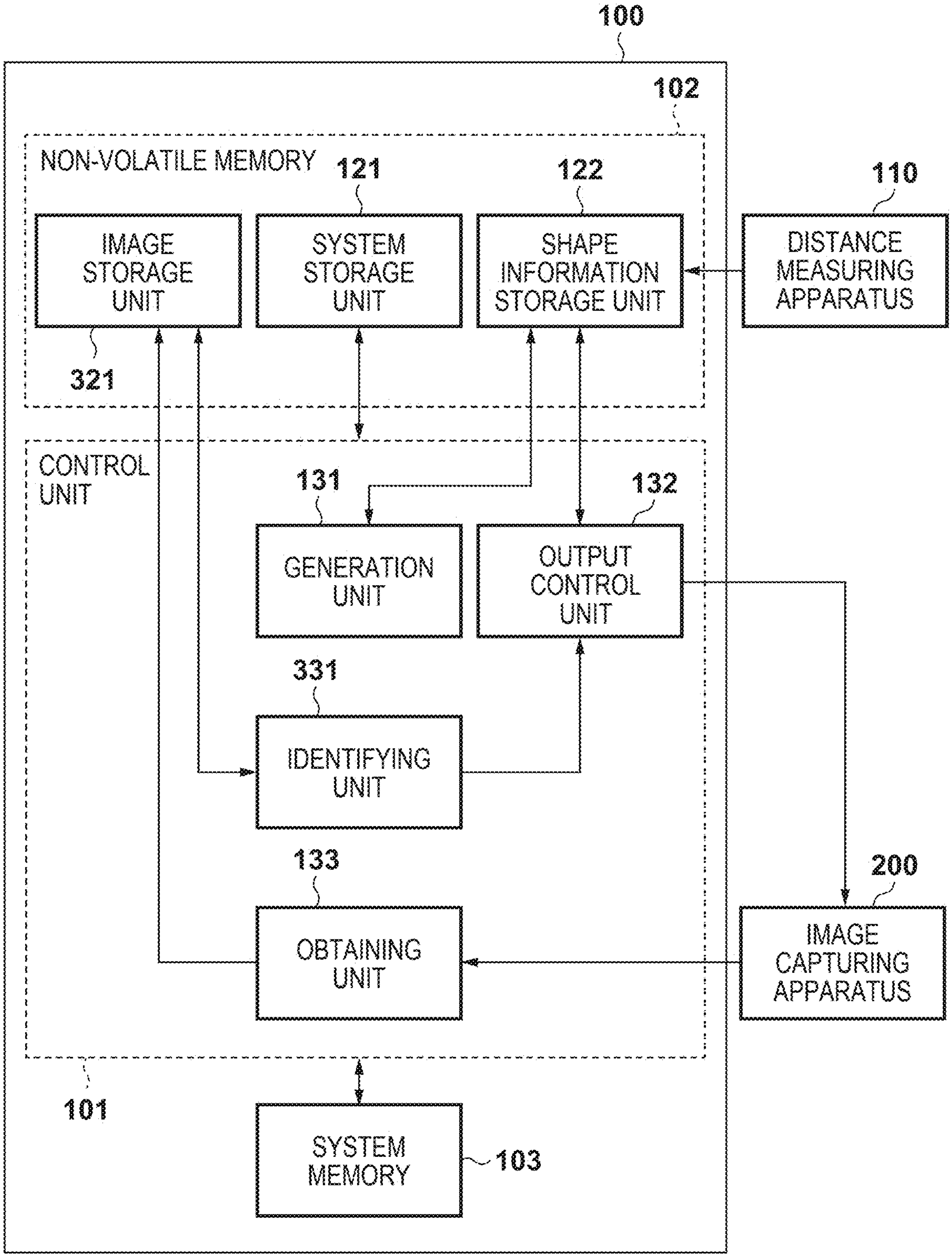
FIG. 3 is a block diagram illustrating the functional configuration of an imaging system according to a second embodiment of the present invention.

To realize such output control, in the imaging system according to the present embodiment, the PC 100 includes the functional configuration illustrated in FIG. 3. In the present embodiment, the obtaining unit 133 intermittently obtains captured images during image capturing by the image capturing apparatus 200 as state information. The captured images obtained by the obtaining unit 133 are stored in an image storage unit 321 of the non-volatile memory 102. The PC 100 according to the present embodiment operates as an identifying unit 331, and the identifying unit 331 identifies the type of the subject found in the captured image (in the shooting field of view) on the basis of the captured images stored in the image storage unit 321. Here, the subject type may be identified by the identifying unit 331 using an inference model obtained via deep learning using a CNN, for example. The information of the subject type identified by the identifying unit 331 is stored in the system memory 103, for example, and is put in a state in which it can be referenced by the output control unit 132.

On the basis of the subject type identified by the identifying unit 331, the output control unit 132 controls whether to output low resolution shape information or high resolution shape information as the three-dimensional shape information to the image capturing apparatus 200. In other words, in the present embodiment, in a case where the subject type identified by the identifying unit 331 is a person, the output control unit 132 performs control to output high resolution shape information to the image capturing apparatus 200.

As in the first embodiment described above, if high resolution shape information is not to be output to the image capturing apparatus 200, there is no need to execute processing to generate high resolution shape information from the low resolution shape information in the PC 100. Thus, in a case where the subject type found in the shooting field of view of the image capturing apparatus 200 is a person, the output control unit 132 performs control so that the generation unit 131 does not execute processing to generate the high resolution shape information.

Output Control Processing

Figure 4:
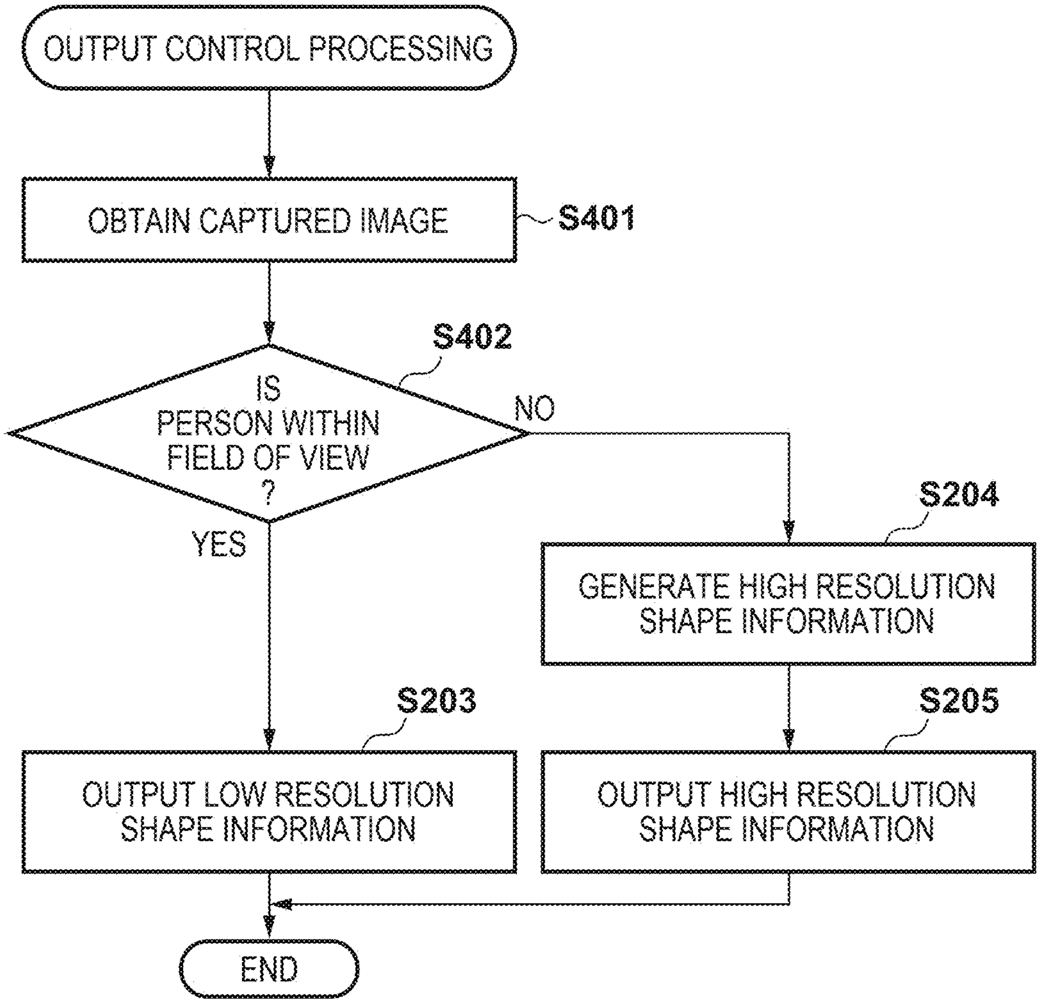
FIG. 4 is a flowchart illustrating the output control processing executed by a PC 100 according to the second embodiment of the present invention.

The output control processing executed by the PC 100 according to the present embodiment will be described below in detail using the flowchart of FIG. 4. The processing corresponding to the flowchart can be implemented by the control unit 101 reading out the corresponding processing programs stored in the non-volatile memory 102, for example, loading them onto the system memory 103, and executing them. The present output control processing described herein, for example, is started when the image capturing apparatus 200 and the PC 100 are connected and a shooting mode for performing a predetermined operation using three-dimensional shape information being set in the image capturing apparatus 200 is detected and is repeated at a predetermined frequency.

Note that in a case where the operations of the processes described hereinafter are implemented by the functional components (the generation unit 131, the output control unit 132, and the obtaining unit 133) of the control unit 101, they are described with the functional component as the subject. Also, for the output control processing according to the present embodiment, the processes for executing processing similar to the output control processing of the first embodiment are given the same reference number and description thereof is omitted. Only the process for executing processing specific to the present embodiment will be described below in detail.

In step S401, the obtaining unit 133 obtains a captured image from the image capturing apparatus 200 and stores it in the image storage unit 321. When the captured image is stored in the image storage unit 321, the identifying unit 331 identifies the subject type found in the captured image.

In step S402, the output control unit 132 determines whether or not a person is found in the field of view of the image capturing apparatus 200 on the basis of information of the subject type identified in step S401. In a case where the output control unit 132 determines that a person is found in the field of view of the image capturing apparatus 200, the output control unit 132 advances the processing to step S203. In a case where the output control unit 132 determines that a person is not found, the output control unit 132 advances the processing to step S204.

As described above, according to the present embodiment, in the information processing apparatus of the present embodiment, the three-dimensional shape information output is different depending on what subject is found in the field of view of the image capturing apparatus. Specifically, in a case where the type of the subject being shot by the image capturing apparatus is a predetermined subject type, the information processing apparatus according to the present embodiment outputs low resolution shape information to the image capturing apparatus to suppress a processing delay in the image capturing apparatus. On the other hand, in a case where the type of the subject being shot by the image capturing apparatus is not the predetermined subject type, an increase in accuracy in the focus control, subject detection, and the like in the image capturing apparatus can be achieved by outputting the high resolution shape information to image capturing apparatus.

Note that in the present embodiment, a captured image from the image capturing apparatus 200 is obtained as the state information, and the subject type is identified on the basis of the captured image by the PC 100. However, the embodiments of the present invention are not limited thereto. For example, identifying the subject type may be performed in the image capturing apparatus 200, and information of the subject type may be able to the obtained as state information. Alternatively, for example, identifying the subject type can be performed on the basis of the detection result from another sensor including, for example, shape information obtained by an ultrasonic sensor, temperature information obtained by a temperature sensor, a combination thereof, and the like.

Also, in the present embodiment described above, whether the subject being shot by the image capturing apparatus 200 is a subject for which an image capture operation with a short exposure time should be performed is determined on the basis of the subject type. However, the embodiments of the present invention are not limited thereto. Whether or not to perform an image capture operation with a short exposure time can be determined on the basis of the movement state of the subject identified on the basis of the group of continuously obtained captured images, for example. For example, the movement state may be identified on the basis of the movement amount of an image of the subject with respect to an elapsed time corresponding to the captured image group, and in a case where the subject is moving or moving at high-speeds, it may be determined to perform image capture operation at a short exposure time.

Second Modified Example

In the second embodiment described above, the three-dimensional shape information to be output is different depending on whether or not the subject type is a specific type for which an image capture operation with a short exposure time should be performed. However, the embodiments of the present invention are not limited thereto. In other words, instead of being dependent on the subject type, in a case where the image capturing apparatus is set to a fast shutter speed, to reduce the occurrence of processing delay in the image capturing apparatus 200, the output control unit 132 may perform control to output low resolution shape information. In this aspect, the state information obtained by the obtaining unit 133 includes information of the shutter speed set in the image capturing apparatus 200. Also, it is sufficient that the output control unit 132 performs control to output low resolution shape information in a case where the shutter speed is less than a predetermined amount of time and outputs high resolution shape information in a case where the shutter speed is greater than the predetermined amount of time.

Third Modified Example

In the embodiments and modified examples described above, in a case where low resolution shape information is output to the image capturing apparatus 200 to reduce the computation load in the PC 100, control is performed so that the generation unit 131 does not generate high resolution shape information. However, the embodiments of the present invention are not limited thereto. High resolution shape information may be generated for all of the low resolution shape information obtained from the distance measuring apparatus 110 so that they can be used in analysis of the post-image-capture image data, for example.

Fourth Modified Example

In the embodiments and modified examples described above, an inference model obtained via deep learning using a CNN is used to generate high resolution shape information based on low resolution shape information. However, the embodiments of the present invention are not limited thereto. The high resolution shape information may be generated using another known inference model obtained via deep learning such as a diffusion generation model, for example. Alternatively, the high resolution shape information may be generated using another method that does not use deep learning such as a bicubic method or the like. Also, high resolution shape information may be generated using a method such as depth completion or the like by referencing both low resolution shape information and captured images of the image capturing apparatus 200.

Third Embodiment

In the embodiments and modified examples described above, the three-dimensional shape information output by the distance measuring apparatus 110 is low resolution shape information and the generation unit 131 generates high resolution shape information from the low resolution shape information. However, the embodiments of the present invention are not limited thereto. For example, in an aspect in which the distance measuring apparatus 110 is configured to generate both low resolution shape information and high resolution shape information, the present invention can be realized without the generation unit 131 generating high resolution shape information. In other words, the three-dimensional shape information output from the PC 100 to the image capturing apparatus 200 is generated by the distance measuring apparatus 110 in either case, and the control unit 101 performs output control by changing the three-dimensional shape information generated by the distance measuring apparatus 110 depending on the state information. In other words, the output control unit 132 according to the present embodiment is configured to transmit the three-dimensional shape information obtained from the distance measuring apparatus 110 to the image capturing apparatus 200 regardless of the state information.

Figure 5:
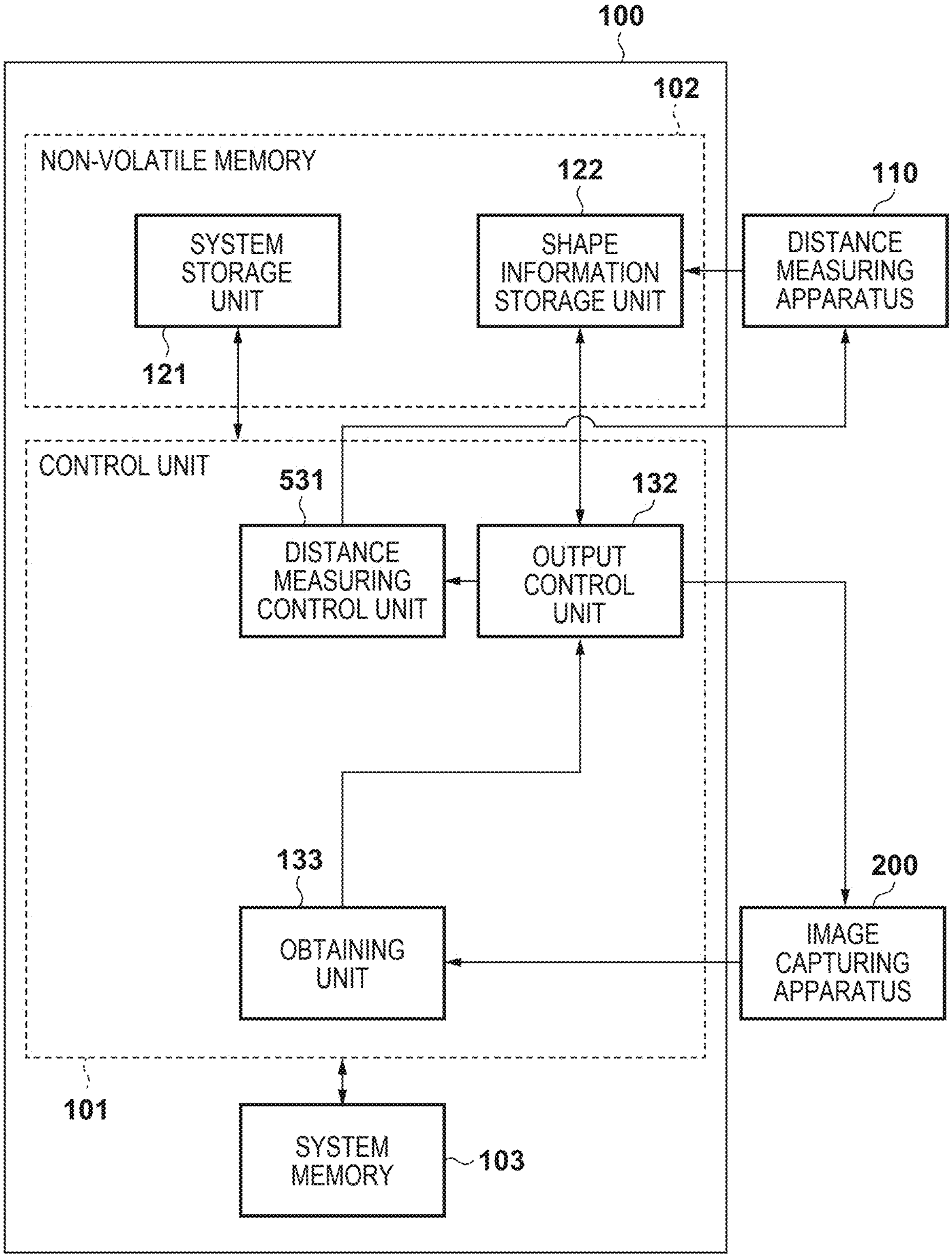
FIG. 5 is a block diagram illustrating the functional configuration of an imaging system according to a third embodiment of the present invention.

To realize such output control, in the imaging system according to the present embodiment, the PC 100 includes the functional configuration illustrated in FIG. 5. As illustrated, in the PC 100 according to the present embodiment, the control unit 101 includes a distance measuring control unit 531 that controls the operation of the distance measuring apparatus 110 instead of the functional configuration of the generation unit 131.

The distance measuring control unit 531 controls changing the three-dimensional shape information generated by the distance measuring apparatus 110 depending on the state information. The distance measuring apparatus 110 according to the present embodiment is configured to switch spatial resolutions when generating three-dimensional shape information.

Figure 6A:
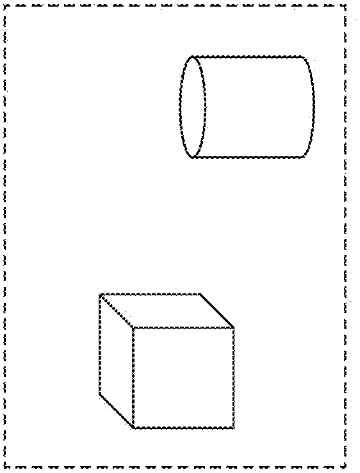
FIGS. 6A, 6B, and 6C are diagrams for explaining an example of the operation of a distance measuring apparatus 110 according to the third embodiment of the present invention.
Figure 6B:
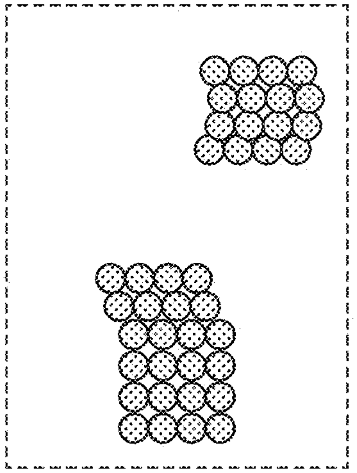
Figure 6C:
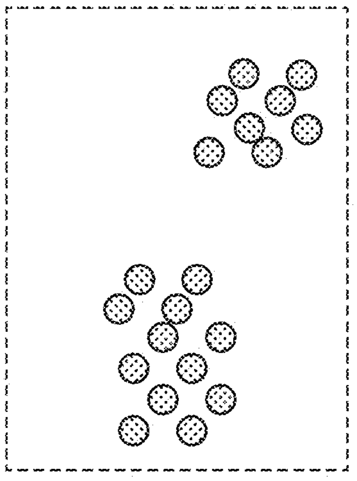

For example, consider an example where the distance measuring scene of the distance measuring apparatus 110 (corresponding to the scene shot by the image capturing apparatus 200) is one such as that illustrated in FIG. 6A. At this time, distance measuring with the spatial resolution of the distance measuring apparatus 110 set to maximum produces the three-dimensional point groups illustrated in FIG. 6B. On the other hand, distance measuring with the spatial resolution of the distance measuring apparatus 110 set to minimum (restricted value) produces the three-dimensional point groups illustrated in FIG. 6C. As illustrated, by changing the distance measuring spatial resolution, the density of the obtained three-dimensional point groups is changed. Specifically, the three-dimensional point groups are in a more spatially dense state when the spatial resolution is high and are in a more spatially sparse state when the spatial resolution is low.

Accordingly, the distance measuring apparatus 110 can generate high resolution shape information from the dense three-dimensional point groups obtained in a state where the spatial resolution is set to maximum. Also, the distance measuring apparatus 110 can generate low resolution shape information from the sparse three-dimensional point groups obtained in a state where the spatial resolution is set to minimum.

In this manner, the distance measuring control unit 531 can perform control to change the spatial resolution of the three-dimensional shape information generated by the distance measuring apparatus 110, and as a result, the spatial resolution of the three-dimensional shape information output from the output control unit 132 to the image capturing apparatus 200 can be changed. In other words, the distance measuring apparatus 110 is configured to output either the low resolution shape information or the high resolution shape information via the control by the distance measuring control unit 531. In other words, as in the embodiments and modified examples described above, high resolution shape information is stored in the shape information storage unit 122 only when outputting to the image capturing apparatus 200.

Note that in the present embodiment, the obtaining unit 133 intermittently obtains state information including information that can identify whether or not continuous shooting is being performed from the image capturing apparatus 200 as in the first embodiment. In other words, on the basis of the state information, the output control unit 132 can determine whether or not the image capturing apparatus 200 is performing continuous shooting and can cause the distance measuring control unit 531 to switch the operation of the distance measuring apparatus 110.

Output Control Processing

Figure 7:
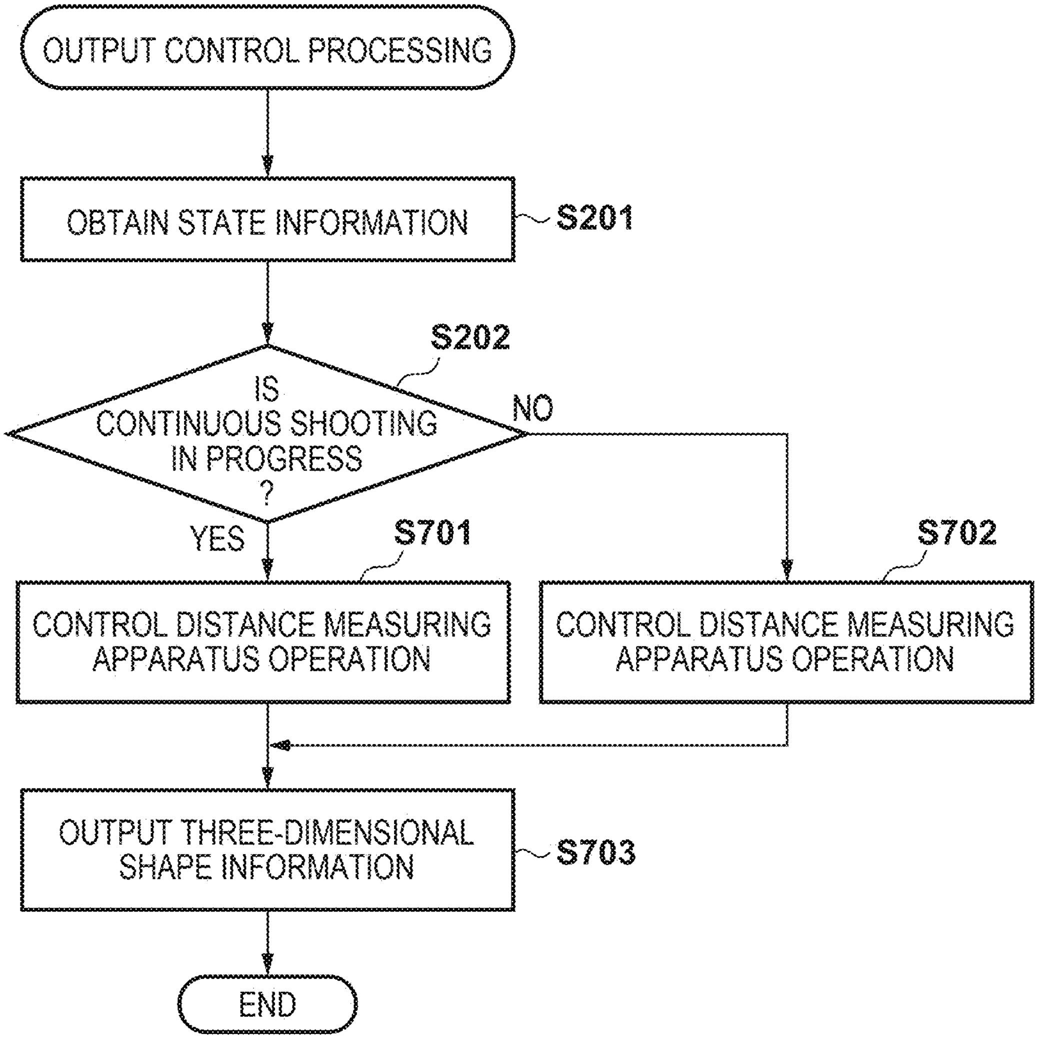
FIG. 7 is a flowchart illustrating the output control processing executed by a PC 100 according to the third embodiment of the present invention.

The output control processing executed by the PC 100 according to the present embodiment will be described below in detail using the flowchart of FIG. 7. The processing corresponding to the flowchart can be implemented by the control unit 101 reading out the corresponding processing programs stored in the non-volatile memory 102, for example, loading them onto the system memory 103, and executing them. The present output control processing described herein, for example, is started when the image capturing apparatus 200 and the PC 100 are connected and a shooting mode for performing a predetermined operation using three-dimensional shape information being set in the image capturing apparatus 200 is detected and is repeated at a predetermined frequency.

Note that in a case where the operations of the processes described hereinafter are implemented by the functional components (the generation unit 131, the output control unit 132, and the obtaining unit 133) of the control unit 101, they are described with the functional component as the subject. Also, for the output control processing according to the present embodiment, the processes for executing processing similar to the output control processing of the first embodiment are given the same reference number and description thereof is omitted. Only the process for executing processing specific to the present embodiment will be described below in detail.

In a case where it is determined that continuous shooting is being performed in step S202, in step S701, the distance measuring control unit 531, under control of the output control unit 132, controls the operation of the distance measuring apparatus 110 to generate low resolution shape information. According to the processing of the present process, the distance measuring apparatus 110 performs distance measuring of the scene and outputs low resolution shape information. The low resolution shape information is then stored in the shape information storage unit 122.

On the other hand, in a case where it is determined that continuous shooting is not being performed in step S202, in step S702, the distance measuring control unit 531, under control of the output control unit 132, controls the operation of the distance measuring apparatus 110 to generate high resolution shape information. According to the processing of the present process, the distance measuring apparatus 110 performs distance measuring of the scene and outputs high resolution shape information. The high resolution shape information is then stored in the shape information storage unit 122.

In step S703, the output control unit 132 outputs the three-dimensional shape information stored in the shape information storage unit 122 to the image capturing apparatus 200, and the output control unit 132 completes the present output control processing. In other words, in a case where the image capturing apparatus 200 is performing continuous shooting, low resolution shape information is output, and in a case where the image capturing apparatus 200 is not performing continuous shooting, high resolution shape information is output.

In this manner, as in the first embodiment, three-dimensional shape information suited to the state of the image capturing apparatus can be output. Note that in the present embodiment described above, the state information is similar to that in the first embodiment and the three-dimensional shape information to be output is switched depending on whether or not the image capturing apparatus 200 is performing continuous shooting. However, the embodiments of the present invention are not limited thereto. The state information can be information that can identify the subject type found in the field of view of the image capturing apparatus 200 as in the second embodiment, and the three-dimensional shape information to be output can be switched depending on the subject type.

Fifth Modified Example

In the embodiments and modified examples described above, a LiDAR sensor is used as the distance measuring apparatus 110 and three-dimensional point groups are used as the three-dimensional shape information. However, the embodiments of the present invention are not limited thereto. The distance measuring apparatus 110 is not limited to a LiDAR sensor, and a laser scanner, a stereo vision hardware system, or a system that generates three-dimensional shape on the basis of a moving image can be used. Also, the three-dimensional shape information does not need to be three-dimensional point groups, and format information configured by a known method such as a voxel, mesh, implicit function expression, or similar method can be used.

Sixth Modified Example

In the embodiment and modified example described above, from the perspective of avoiding computation resource pressure and avoiding processing delay in the image capturing apparatus 200, the output of high resolution shape information is restricted. However, the embodiments of the present invention are not limited thereto.

For example, in a case where the image capturing apparatus 200 detects a predetermined subject and performs image capture in a low brightness scene, it may be hard to detect the subject on the basis of the captured images of the scene. In such cases, subject detection can obtain a better result using three-dimensional shape information, and, in light of performing subject detection on the basis of mainly three-dimensional shape information, the accuracy of subject detection can be better guaranteed using high resolution shape information.

Accordingly, in a case where a low brightness scene is shot and the image capturing apparatus 200 is required to detect a predetermined subject with high accuracy, the output control unit 132 may perform control so that high resolution shape information is output to the image capturing apparatus 200. In an aspect, to realize such control, information of the shooting mode set for the image capturing apparatus 200 is included as the state information, and the output control unit 132 performs output control on the basis of the information of the shooting mode. For example, information of the subject detection accuracy required depending on whether or not subject detection is required or the like is associated with each shooting mode in advance, and the output control unit 132 switches the three-dimensional shape information to be output depending on the information of the subject detection accuracy set for the set shooting mode. The required detection accuracy is classified into two levels, a first detection accuracy (where detection accuracy is not required) and a second detection accuracy (where detection accuracy is required). The output control unit 132 performs control so that high resolution shape information is output by control unit 132 in the latter case and low resolution shape information is output in the former case.

In this manner, three-dimensional shape information suitable to the use, application, or the like of the image capturing apparatus 200 can be output.

Seventh Modified Example

In the embodiment and the modified examples described above, the present invention is implemented via an imaging system in which a plurality of devices (the image capturing apparatus 200, the PC 100 (information processing apparatus), and the distance measuring apparatus 110) are connected. However, the present disclosure is not limited thereto. However, it should be understood that the present invention can be implement via a configuration in which the distance measuring apparatus 110 is embedded in the information processing apparatus or a configuration in which the information processing apparatus is embedded in the image capturing apparatus 200 as a processor.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-000307, filed Jan. 4, 2024, which is hereby incorporated by reference herein in its entirety.

What is claimed is:

1. An information processing apparatus comprising:

at least one processor and/or circuit; and at least one memory storing a computer program, which causes the at least one processor and/or circuit to function as a plurality of units comprising:

(1) a first obtaining unit configured to obtain three-dimensional shape information of a scene shot by an image capturing apparatus, (2) a second obtaining unit configured to obtain state information relating to an image capturing state of the image capturing apparatus, (3) an output unit configured to output the three-dimensional shape information to the image capturing apparatus, and (4) a control unit configured to control an operation of the output unit, wherein the first obtaining unit obtains at least first three-dimensional shape information or second three-dimensional shape information with a higher spatial resolution than the first three-dimensional shape information for the scene, wherein the control unit controls whether the first three-dimensional shape information or the second three-dimensional shape information is output according to the state information, wherein the state information includes information relating to image capture frequency of the image capturing apparatus, and wherein the control unit (1) causes the output unit to output the first three-dimensional shape information in a case where image capture frequency of the image capturing apparatus is greater than a predetermined threshold and (2) causes the output unit to output the second three-dimensional shape information in a case where image capture frequency of the image capturing apparatus is less than the predetermined threshold.

2. The information processing apparatus according to claim 1, wherein the state information includes information indicating a shooting mode set in the image capturing apparatus, wherein a required subject detection accuracy is associated with each shooting mode set in the image capturing apparatus, and wherein the control unit (1) causes the output unit to output the first three-dimensional shape information in a case where a shooting mode requiring a first detection accuracy is set in the image capturing apparatus, and (2) causes the output unit to output the second three-dimensional shape information in a case where a shooting mode requiring a second detection accuracy higher than the first detection accuracy is set in the image capturing apparatus.

3. The information processing apparatus according to claim 1, wherein the computer program further causes the at least one processor and/or circuit to function as a generating unit configured to generate the second three-dimensional shape information on a basis of the first three-dimensional shape information obtained by the first obtaining unit, and wherein the first obtaining unit obtains the second three-dimensional shape information generated by the generating unit.

4. The information processing apparatus according to claim 3, wherein in a case where the control unit causes the output unit to output the first three-dimensional shape information, the control unit further performs control so that the generating unit does not generate the second three-dimensional shape information.

5. The information processing apparatus according to claim 3, wherein the computer program further causes the at least one processor and/or circuit to function as a distance measuring unit configured to perform distance measuring of the scene and to generate the three-dimensional shape information, and wherein the first obtaining unit obtains the three-dimensional shape information generated by the distance measuring unit.

6. The information processing apparatus according to claim 1, wherein the computer program further causes the at least one processor and/or circuit to function as a distance measuring unit configured to perform distance measuring of the scene and to generate the three-dimensional shape information, wherein the first obtaining unit obtains the three-dimensional shape information generated by the distance measuring unit, and wherein the control unit (1) controls the spatial resolution of the distance measuring by the distance measuring unit according to the state information, and (2) causes the output unit to output the three-dimensional shape information obtained by the first obtaining unit.

7. A control method for an information processing apparatus, the control method comprising:

obtaining three-dimensional shape information of a scene shot by an image capturing apparatus;

obtaining state information relating to an image capturing state of the image capturing apparatus;

outputting the three-dimensional shape information to the image capturing apparatus; and controlling an operation of the outputting, wherein at least first three-dimensional shape information or second three-dimensional shape information with a higher spatial resolution than the first three-dimensional shape information is obtained for the scene, wherein whether the first three-dimensional shape information or the second three-dimensional shape information is output is controlled according to the state information, wherein the state information includes information relating to image capture frequency of the image capturing apparatus, and wherein in the controlling, (1) the first three-dimensional shape information is output in a case where image capture frequency of the image capturing apparatus is greater than a predetermined threshold and (2) the second three-dimensional shape information is output in a case where image capture frequency of the image capturing apparatus is less than the predetermined threshold.

8. A non-transitory computer-readable storage medium storing a program configured to cause a computer to function as the information processing apparatus according to claim 1.

9. An imaging system comprising:

the information processing apparatus according to claim 1;

an image capturing apparatus; and a distance measuring apparatus that performs distance measuring of a scene shot by the image capturing apparatus and generates three-dimensional shape information.

10. The imaging system according to claim 9, wherein the image capturing apparatus comprises:

an imaging optical system, an imaging unit, at least one processor and/or circuit, and at least one memory storing a computer program, which causes the at least one processor and/or circuit to function as a plurality of units comprising:

(1) an obtaining unit configured to obtain the three-dimensional shape information output by the output unit, (2) a determining unit configured to determine a focus position on a basis of the three-dimensional shape information obtained by the obtaining unit, and (3) a changing unit configured to change a state of the imaging optical system on a basis of the focus position determined by the determining unit.

11. The imaging system according to claim 9, wherein the image capturing apparatus comprises:

an imaging unit, an obtaining unit that obtains the three-dimensional shape information output by the output unit, at least one processor and/or circuit, and at least one memory storing a computer program, which causes the at least one processor and/or circuit to function as a plurality of units comprising:

(1) a detecting unit configured to detect a subject on a basis of the three-dimensional shape information obtained by the obtaining unit, and (2) an exposure control unit configured to perform exposure control for the imaging unit on a basis of a detection result from the detecting unit.

12. An information processing apparatus comprising:

at least one processor and/or circuit; and at least one memory storing a computer program, which causes the at least one processor and/or circuit to function as a plurality of units comprising:

(1) a first obtaining unit configured to obtain three-dimensional shape information of a scene shot by an image capturing apparatus, (2) a second obtaining unit configured to obtain state information relating to an image capturing state of the image capturing apparatus, (3) an output unit configured to output the three-dimensional shape information to the image capturing apparatus, and (4) a control unit configured to control an operation of the output unit, wherein the first obtaining unit obtains at least first three-dimensional shape information or second three-dimensional shape information with a higher spatial resolution than the first three-dimensional shape information for the scene, wherein the control unit controls whether the first three-dimensional shape information or the second three-dimensional shape information is output according to the state information, wherein the state information includes information indicating whether or not the image capturing apparatus is performing continuous shooting, and wherein the control unit (1) causes the output unit to output the first three-dimensional shape information in a case where the image capturing apparatus is performing continuous shooting and (2) causes the output unit to output the second three-dimensional shape information in a case where the image capturing apparatus is not performing continuous shooting.

13. An information processing apparatus comprising:

at least one processor and/or circuit; and at least one memory storing a computer program, which causes the at least one processor and/or circuit to function as a plurality of units comprising:

(1) a first obtaining unit configured to obtain three-dimensional shape information of a scene shot by an image capturing apparatus, (2) a second obtaining unit configured to obtain state information relating to an image capturing state of the image capturing apparatus, (3) an output unit configured to output the three-dimensional shape information to the image capturing apparatus, and (4) a control unit configured to control an operation of the output unit, wherein the first obtaining unit obtains at least first three-dimensional shape information or second three-dimensional shape information with a higher spatial resolution than the first three-dimensional shape information for the scene, wherein the control unit controls whether the first three-dimensional shape information or the second three-dimensional shape information is output according to the state information, wherein the state information includes information indicating a type of a subject being shot by the image capturing apparatus, wherein the control unit (1) causes the output unit to output the first three-dimensional shape information in a case where a type of a subject being shot by the image capturing apparatus is a predetermined subject type and (2) causes the output unit to output the second three-dimensional shape information in a case where a type of a subject being shot by the image capturing apparatus is not the predetermined subject type, and wherein the predetermined subject type is a subject type set with a recommended shutter speed for image capture that is less than a predetermined amount of time.

14. An information processing apparatus comprising:

at least one processor and/or circuit; and at least one memory storing a computer program, which causes the at least one processor and/or circuit to function as a plurality of units comprising:

(1) a first obtaining unit configured to obtain three-dimensional shape information of a scene shot by an image capturing apparatus, (2) a second obtaining unit configured to obtain state information relating to an image capturing state of the image capturing apparatus, (3) an output unit configured to output the three-dimensional shape information to the image capturing apparatus, and (4) a control unit configured to control an operation of the output unit, wherein the first obtaining unit obtains at least first three-dimensional shape information or second three-dimensional shape information with a higher spatial resolution than the first three-dimensional shape information for the scene, wherein the control unit controls whether the first three-dimensional shape information or the second three-dimensional shape information is output according to the state information, wherein the state information includes information of a shutter speed set in the image capturing apparatus, and wherein the control unit (1) causes the output unit to output the first three-dimensional shape information in a case where a shutter speed set in the image capturing apparatus is shorter than a predetermined amount of time and (2) causes the output unit to output the second three-dimensional shape information in a case where a shutter speed set in the image capturing apparatus is longer than the predetermined amount of time.

* * * * *